W. E. SAWYER.
ELECTRICAL CIRCUITS FOR CHEMICAL TELEGRAPHS.
No. 182,486. Patented Sept. 19, 1876.
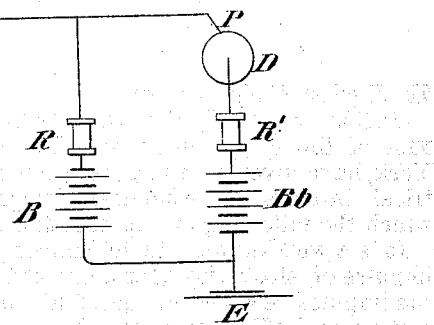
WITNESSES:
John Goethals
Alex H. Roberts
INVENTOR:
W. E. Sawyer
BY
ATTORNEYS.

UNITED STATES PATENT OFFICE.

WILLIAM E. SAWYER, OF NEW YORK, N. Y., ASSIGNOR OF THREE-FOURTHS OF HIS RIGHT TO JAS. G. SMITH, OF HACKENSACK, AND ROBT. F. STOCKTON AND EDWARD J. ANDERSON, OF TRENTON, NEW JERSEY.

IMPROVEMENT IN ELECTRICAL CIRCUITS FOR CHEMICAL TELEGRAPHS.

Specification forming part of Letters Patent No. 182,486, dated September 19, 1876; application filed January 22, 1876.

*To all whom it may concern:*

Be it known that I, WILLIAM EDWARD SAWYER, of the city, county, and State of New York, have invented an Improvement in Electrical Circuits for Chemical Telegraphs, of which the following is a specification:

It is a well-known fact in transmitting an impulse of electricity over a line of telegraph the impulse becomes elongated at the distant station, and, if left uncorrected, causes a distortion of the signal sent. To obviate this difficulty I so arrange my batteries as to maintain an electrical equilibrium of the line until the instant of transmission of a signal, when the equilibrium is destroyed, and the line is charged with a single current.

In the drawing, for convenience, I have merely indicated the sending instrument, and that as consisting of a drum and stylus, such as is used in so-called automatic telegraphs. It is, however, obvious that any kind of an instrument may be placed in the circuit.

Referring to the drawing, D is the drum; T, the stilus; E, the earth, and R R' adjustable rheostats, each of the latter equaling, or exceeding, the resistance of the line. B is the main transmitting-battery, with the positive pole to the line. B $b$ is a second main battery, with the negative pole to drum.

It is evident that, so long as there is a connection between the stylus and the drum, both batteries are thrown into the line, since the resistance of R' prevents the battery B from short-circuiting, and the resistance of R prevents the second main battery from short-circuiting, and the line is kept in electrical equilibrium. The instant, however, that the connection of drum and stylus is interrupted, battery B $b$ is taken from the line, and the line is then positively charged by battery B when a signal is made.

A local marking-battery in a shunt at the receiving instrument may supplement the main marking-battery, but this is unnecessary. Induced currents may be used instead of battery-currents.

Having thus described all that is necessary to a full understanding of my invention, what I claim as new is—

In a chemical telegraph, the combination, with a battery of one polarity, which is thrown into the line by a metallic contact, of a battery of opposite polarity in a shunt, so arranged that the second battery will be constantly upon the line, the combined batteries maintaining an electrical equilibrium of the line, and the transmission of a signal being effected by the removal of the first battery through breaking the metallic contact, as set forth.

WM. E. SAWYER.

Witnesses:
   T. B. MOSHER,
   ALEX. F. ROBERTS.